Sept. 27, 1955                R. B. THURMAN                2,718,725
                              FISHING LURE
                           Filed July 23, 1954

ROBERT B. THURMAN.
           INVENTOR.

BY
       Patrick D. Beaver
                ATTORNEY

United States Patent Office 2,718,725
Patented Sept. 27, 1955

2,718,725

FISHING LURE

Robert B. Thurman, Sparta, Tenn.

Application July 23, 1954, Serial No. 445,421

2 Claims. (Cl. 43—42.31)

This invention relates to improvements in fishing lures and the primary object of the present invention is to provide a fishing lure which, by its erratic motion and sound producing characteristic, will attract the fish thereto.

Another object of the invention is to provide a fishing lure having a cavity therein with the floor of the cavity inclined from the tail to the head of the fishing lure and having a sepentine groove therein and balls freely movable in the serpentine groove to cause the emission of sound and erratic motion of the fishing lure while travelling through the water.

A further object of the invention is to provide a bill on the front of the head of the fishing lure and a pivoted tail on the rear end of the fishing lure.

With the above and other objects and advantages in view the invention consists of the novel details of construction, arrangement and combination of parts more fully hereinafter described, claimed and illustrated in the accompanying drawing in which:

Figure 1:
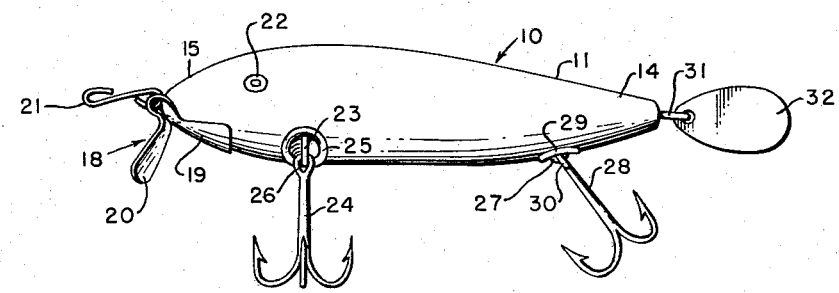
Fig. 1 is an elevational view of a fishing lure embodying the invention.
Figure 2:
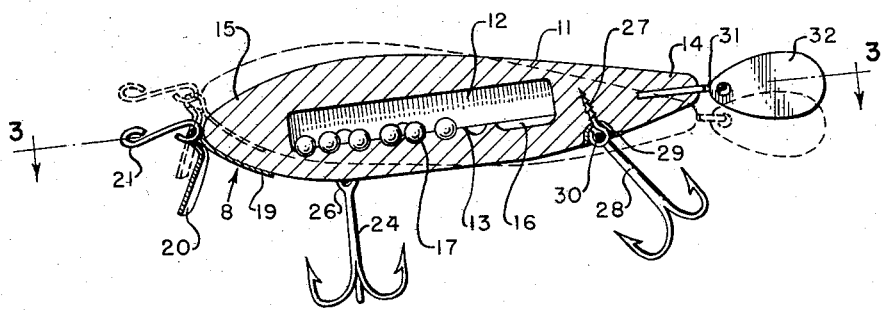
Fig. 2 is a longitudinal sectional view on the line 2—2 of Fig. 3.
Figure 3:
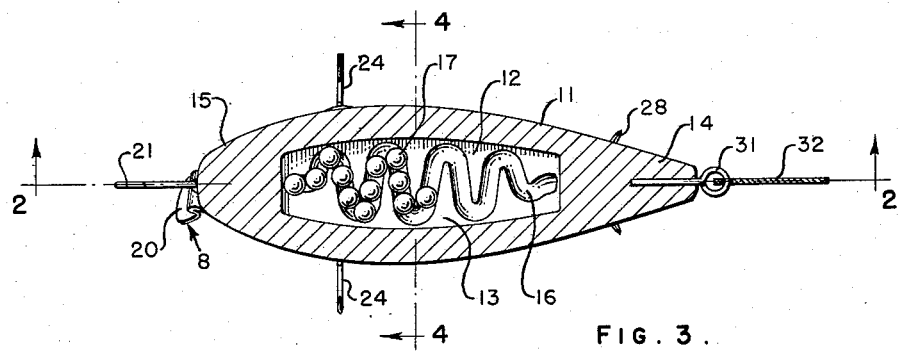
Fig. 3 is a longitudinal sectional view on the line 3—3 of Fig. 2.
Figure 4:
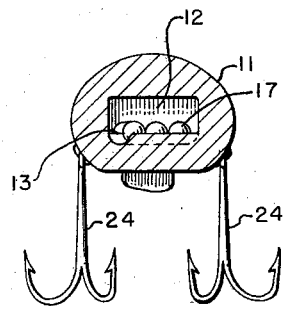
Fig. 4 is a transverse sectional view on the line 4—4 of Fig. 3.

Referring more in detail to the drawing wherein like parts are designated by like reference numerals, a fishing lure embodying the invention is generally indicated by the reference numeral 10.

The fishing lure 10 has an elongated body 11 of any desired shape and size to simulate more or less the body of a fish.

Within the body 11 there is provided an elongated cavity 12 which follows the general contour of the body. The body may be divided in sections to permit the forming of the cavity and such division may assume a transverse demarcation line or a longitudinal demarcation line not shown.

The cavity 12 is so positioned in the body 11 that a floor 13 of the cavity follows an inclined plane that extends downwardly from the tail 14 of the fishing lure 10 to the head 15 thereof.

The floor 13 of the cavity 12 is provided with a serpentine groove 16 and freely movable within the groove 16 are a plurality of balls 17. Due to the inclination of the floor 13 of the cavity 12, the balls will travel down the groove 16 from the tail 14 to the head 15 when the fishing lure is in a horizontal position.

At the front of the head 15 a bill 18 is secured by any well known means and the bill 18 has a body conforming portion 19 which engages the undersurface of the head 15 and a depending portion 20 which acts as a guide for the fishing lure as it is pulled through the water.

A double eyed line attaching coupling 21 is connected to the bill 18 at the point of dependency of the portion 20. An artificial eye 22 is positioned on opposite sides of the head 15 to simulate the eyes of a fish.

On each side of the body 11 adjacent the body conforming portion 19 of the bill 18, there is connected to the body 11 a screw eye 23 to which is attached a gang hook 24 and a wear cup 25 is countersunk into the body and receives the screw eye 23 and an eye 26 of the gang hook 24.

A third screw eye 27 is connected to the bottom surface of the body 11 adjacent the end of the cavity 12 and a gang hook 28 is connected to the screw eye 27. A wear cup 29 is also countersunk into the body 11 about the screw eye 27 to receive the screw eye 27 and an eye 30 of the gang hook 28.

A screw eye 31 is connected to the rear end of the tail 14 of the fishing lure 10 and a spinner 32 is loosely connected to the screw eye 31.

The body 11 may be constructed of any suitable material and decorated in any approved fashion to form an attraction for the fish.

In the use of the fishing lure embodying the present invention, which is of the floating or shallow running type, the balls 17 will tend to roll down the inclined floor 13 of the cavity 12 within the serpentine groove 16, if the fishing lure 10 is in a horizontal position. The balls 17 in their movement will cause the fishing lure to wobble or shimmy, if it is still. When the fishing line, attached to the coupling 21 of the fishing lure 10, is pulled the balls will be caused to move rapidly to the rear of the cavity, causing a slight rattling noise. When the line is slackened, the balls will then move through the groove 16 back to the head 15 of the fishing lure. A slight rattling noise will also be apparent at that time. Thus, by the rattling noise and the erratic movement of the fishing lure, the same will be very attractive to fish.

The bill 18 will cause the fishing lure to dive in the water to enhance the attractiveness of the fishing lure.

There has thus been provided a fishing lure which by sound and movement will be attractive to fish and it is believed that the operation and method of assembly of the fishing lure will be apparent to those skilled in the art.

It is also to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A fishing lure comprising an elongated body having a cavity therein, said cavity having a floor that inclines from one end of the body to the other when the body is in a horizontal position, said floor having a serpentine groove extending longitudinally thereof, and a plurality of balls within said cavity which by the inclination of the floor of said cavity will freely roll within the groove from one end of the body to the other.

2. A fishing lure comprising an elongated body having a cavity therein, said cavity having a floor provided with a serpentine groove extending longitudinally thereof, and a plurality of balls within said cavity which by the inclination of the floor of said cavity will freely roll within the groove from one end of the body to the other.

References Cited in the file of this patent

UNITED STATES PATENTS

| | | |
|---|---|---|
| 841,429 | Passage | Jan. 15, 1907 |
| 843,256 | Bowersox | Feb. 5, 1907 |
| 1,836,651 | Davenport | Dec. 15, 1931 |
| 1,857,939 | Cameron | May 10, 1932 |
| 1,878,015 | Steffensen | Sept. 20, 1932 |
| 2,488,678 | Nardi | Nov. 22, 1949 |
| 2,518,213 | Wood | Aug. 8, 1950 |
| 2,550,247 | Higgins | Apr. 24, 1951 |
| 2,613,471 | Traycik | Oct. 14, 1952 |
| 2,641,862 | Poe | June 16, 1953 |
| 2,659,176 | Wenger | Nov. 17, 1953 |